(12) United States Patent
Wei

(10) Patent No.: US 10,437,351 B2
(45) Date of Patent: Oct. 8, 2019

(54) METHOD FOR DETECTING INPUT DEVICE AND DETECTION DEVICE

(71) Applicant: SHENZHEN GOODIX TECHNOLOGY CO., LTD., Shenzhen (CN)

(72) Inventor: Haijun Wei, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 131 days.

(21) Appl. No.: 15/701,448

(22) Filed: Sep. 12, 2017

(65) Prior Publication Data

US 2018/0052536 A1 Feb. 22, 2018

Related U.S. Application Data

(63) Continuation of application No. PCT/CN2016/095731, filed on Aug. 17, 2016.

(51) Int. Cl.
*G06F 3/0354* (2013.01)
*G06F 3/044* (2006.01)
(Continued)

(52) U.S. Cl.
CPC .......... *G06F 3/03545* (2013.01); *G06F 3/038* (2013.01); *G06F 3/044* (2013.01);
(Continued)

(58) Field of Classification Search
CPC .... G06F 3/03545; G06F 3/038; G06F 3/0416; G06F 3/0428; G06F 3/044; G06F 2203/04104
See application file for complete search history.

(56) References Cited

U.S. PATENT DOCUMENTS

2008/0106520 A1 5/2008 Free et al.
2013/0234967 A1 9/2013 Stoddard
(Continued)

FOREIGN PATENT DOCUMENTS

CN 101976128 A 2/2011
CN 103399683 A 11/2013
(Continued)

OTHER PUBLICATIONS

Extended European Search Report for corresponding European Application No. EP16895744.7 Applicant: Shenzhen Goodix Technology Co., Ltd., dated Feb. 12, 2018, 9 pages.
(Continued)

*Primary Examiner* — Wing H Chow

(57) ABSTRACT

A method for detecting an input device and a detection device. The method includes: acquiring (110) an electric field intensity of an electric field of a transmitting electrode of the input device at each of a plurality of detecting electrodes (810); determining (120) a gravity center position of the electric field and a center position of the electric field according the electric field intensity of the electric field of the transmitting electrode at each of the plurality of detecting electrodes (810); and determining (130) information regarding an attitude and/or a position of the input device according to the gravity center position of the electric field and the center position of the electric field. The method for detecting an input device and the detection device may reduce power consumption.

15 Claims, 6 Drawing Sheets

(51) Int. Cl.
*G06F 3/042* (2006.01)
*G06F 3/038* (2013.01)
*G06F 3/041* (2006.01)

(52) U.S. Cl.
CPC .......... *G06F 3/0416* (2013.01); *G06F 3/0428* (2013.01); *G06F 2203/04104* (2013.01)

(56) References Cited

U.S. PATENT DOCUMENTS

| | | |
|---|---|---|
| 2014/0043301 A1 | 2/2014 | Katsurahira |
| 2015/0261343 A1* | 9/2015 | Leigh ................ G06F 3/03545 345/173 |
| 2015/0293613 A1 | 10/2015 | Johansson et al. |
| 2016/0154528 A1 | 6/2016 | Ahn |

FOREIGN PATENT DOCUMENTS

| | | |
|---|---|---|
| CN | 103425296 A | 12/2013 |
| CN | 103576895 A | 2/2014 |
| CN | 103809882 A | 5/2014 |
| CN | 105807962 A | 7/2016 |
| KR | 20140015703 A | 2/2014 |
| KR | 101598807 B1 | 3/2016 |

OTHER PUBLICATIONS

International Search Report for International Application No. PCT/CN2016/095731, Applicant: Shenzhen Goodix Technology Co., Ltd., dated May 8, 2017, 5 pages.

\* cited by examiner

METHOD FOR DETECTING INPUT DEVICE AND DETECTION DEVICE

CROSS REFERENCE TO RELATED APPLICATIONS

The present application is a continuation of international application No. PCT/CN2016/095731, filed on Aug. 17, 2016, which is hereby incorporated by reference in its entirety.

TECHNICAL FIELD

The present disclosure relates to the field of information technologies, and more specifically, to a method for detecting an input device and a detection device.

BACKGROUND

Nowadays, a multi-functional two-in-one ultrabook is increasingly favored by consumers. As a main peripheral input accessory of an ultrabook, an active capacitive pen attracts gradual attentions of a market. At present, a market of active capacitive products also shows a contending and booming scene, in which contenders are all doing their best to produce products with distinctive functions among which pen body attitude detecting is an outstanding one.

For an ordinary active capacitive pen, a signal is transmitted at a pen point, and a number of detecting electrodes in horizontal and vertical directions are distributed on a touch plane; therefore, the detecting electrodes may be used to detect the signal transmitted from the pen point. Since the signal transmitted from the pen point attenuates during transmission, the shorter a distance between a detecting electrode and the pen point is, the stronger a signal detected by the detecting electrode is, and with an increase in the distance, the signal attenuates gradually. According to this law, a coordinate of the pen point on a screen may be calculated both in the horizontal and vertical directions. Through the above processes, a two-dimensional coordinate of a position of the pen point on the touch plane may be calculated, but an angle between a pen and the screen cannot be learned; however, when people writes, the pen tends to be tilted.

At present, a technical solution of pen body attitude detecting adopts two transmitting electrodes to transmit signals simultaneously, and a tilt angle and a horizontal angle of a pen body with respect to a touch plane are calculated at a touch detecting apparatus side according to a relative position. However, this solution needs two transmitting electrodes, which results in greater power consumption.

SUMMARY

Embodiments of the present disclosure provide a method for detecting an input device and a detection device, which may reduce power consumption.

According to a first aspect, a method for detecting an input device is provided, including:

acquiring an electric field intensity of an electric field of a transmitting electrode of the input device at each of a plurality of detecting electrodes;

determining a gravity center position of the electric field and a center position of the electric field according the electric field intensity of the electric field of the transmitting electrode at each of the plurality of detecting electrodes; and determining information regarding an attitude and/or a position of the input device according to the gravity center position of the electric field and the center position of the electric field.

In a method for detecting an input device of an embodiment of the present disclosure, information regarding an attitude and/or a position of an input device, for example, information regarding a tilt angle, a horizontal angle or a touch position and the like of the input device, is determined according to a gravity center position of an electric field and a center position of the electric field, and in this way, these information may be acquired by only detecting one transmitting electrode, that is, a plurality of transmitting electrodes are not required, thus reducing power consumption and saving costs.

In some possible implementation manners, the plurality of detecting electrodes include $N_1$ detecting electrodes in a first direction and $N_2$ detecting electrodes in a second direction, the first direction being perpendicular to the second direction, $N_1 \geq 2$, and $N_2 \geq 2$.

In some possible implementation manners, the gravity center position $P_{gravity\ center} = (Px_{gravity\ center}, Py_{gravity\ center})$ of the electric field is determined according to the following equations:

$$Px_{gravity\ center} = \frac{\sum_{x=1}^{N_1} E_x * x}{\sum_{x=1}^{N_1} E_x},$$

$$Py_{gravity\ center} = \frac{\sum_{y=1}^{N_2} E_y * y}{\sum_{y=1}^{N_2} E_y}, \text{ and}$$

the center position $P_{center}(Px_{center}, Py_{center})$ of the electric field is determined according to the following equations:

$$\int_{x=1}^{x=Px_{center}} E_x = \frac{1}{2} \int_{x=1}^{x=N_1} E_x,$$

$$\int_{y=1}^{y=Py_{center}} E_x = \frac{1}{2} \int_{y=1}^{y=N_2} E_y,$$

where $P_{gravity\ center}$ represents the gravity center position of the electric field, $Px_{gravity\ center}$ represents a coordinate of the gravity center position of the electric field in a first direction, $Py_{gravity\ center}$ represents a coordinate of the gravity center position of the electric field in a second direction, $P_{center}$ represents the center position of the electric field, $Px_{center}$ represents a coordinate of the center position of the electric field in the first direction, $Py_{center}$ represents a coordinate of the center position of the electric field in the second direction, x represents a coordinate of a detecting electrode in the first direction, $E_x$ represents an electric field intensity detected by the detecting electrode with the coordinate x in the first direction, $N_1$ represents a number of detecting electrodes in the first direction, $N_1 \geq 2$, y represents a coordinate of a detecting electrode in the second direction, $E_y$ represents an electric field intensity detected by the detecting electrode with the coordinate y in the second direction, $N_2$ represents a number of detecting electrodes in the second direction, and $N_2 \geq 2$, the first direction being perpendicular to the second direction.

In some possible implementation manners, the determining the information regarding the attitude and/or the position of the input device according to the gravity center position of the electric field and the center position of the electric field includes:

determining a tilt angle α of the input device according to the following equation:

$$\alpha = f(|dx, dy|)$$

where (dx, dy) represents a vector between the gravity center position of the electric field and the center position of the electric field, | | represents a modulus of the vector, and f represents a forward mapping relationship.

In some possible implementation manners, the determining the information regarding the attitude and/or the position of the input device according to the gravity center position of the electric field and the center position of the electric field includes:

determining a horizontal angle θ of the input device according to the following equation:

$$\theta = \text{argtan}\left(\frac{dy}{dx}\right),$$

where (dx, dy) represents a vector between the gravity center position of the electric field and the center position of the electric field.

In some possible implementation manners, the determining the information regarding the attitude and/or the position of the input device according to the gravity center position of the electric field and the center position of the electric field includes:

determining a touch position $P_{actual}$ of the input device according to the following equation:

$$P_{actual} = P_{center} + h(P_{center} - P_{gravity\ center}),$$

where $P_{gravity\ center}$ is the gravity center position of the electric field, $P_{center}$ is the center position of the electric field, and h represents a forward mapping relationship.

According to a second aspect, a detection device is provided, including modules for executing the method in the first aspect or any possible implementation manner of the first aspect.

According to a third aspect, a detection device is provided, including a plurality of detecting electrodes, a processor and a memory. The plurality of detecting electrodes is configured to detect an electric field intensity of an electric field of a transmitting electrode of an input device at each of the plurality of detecting electrodes. The memory is configured to store an instruction, and the processor is configured to execute the instruction. When the processor executes the instruction stored in the memory, the execution causes the processor to execute the method in the first aspect or any possible implementation manner of the first aspect.

According to a fourth aspect, a system is provided, where the system includes: an input device including a transmitting electrode; and the detection device of the above second aspect or the third aspect.

According to a fifth aspect, a computer readable medium for storing a computer program is provided, where the computer program includes an instruction for executing the method in the first aspect or any possible implementation manner of the first aspect.

BRIEF DESCRIPTION OF DRAWINGS

To describe technical solutions in embodiments of the present disclosure more clearly, a brief introduction to the accompanying drawings required for describing the embodiments of the present disclosure is given below. Apparently, the accompanying drawings in the following description are merely some embodiments of the present disclosure, and other drawings may also be obtained based on these drawings by a person of ordinary skill in the art without involving inventive efforts.

DETAILED DESCRIPTION

The following clearly and completely describes technical solutions in embodiments of the present disclosure with reference to the accompanying drawings in the embodiments of the present disclosure. Apparently, the described embodiments are merely some but not all of the embodiments of the present disclosure. All of other embodiments, obtained by a person of ordinary skill in the art based on the embodiments of the present disclosure without involving inventive efforts, shall fall into the protection scope of the present disclosure.

The technical solutions of the embodiments of the present disclosure can be applied to various touch electronic devices such as a mobile terminal and a computer.

In the embodiments of the present disclosure, an input device may be a device which performs inputting in a touch manner, for example, a capacitive pen, an active pen, etc. The input device includes a transmitting electrode which may send an electrical signal. It should be understood that the transmitting electrode may also be expressed as a transmitting electrode, and the present disclosure does not limit the specific expression.

In the embodiments of the present disclosure, a detection device may detect an input device by detecting an electrical signal sent by the input device. The detection device may be disposed inside a touch screen or a touch pad.

Figure 1:
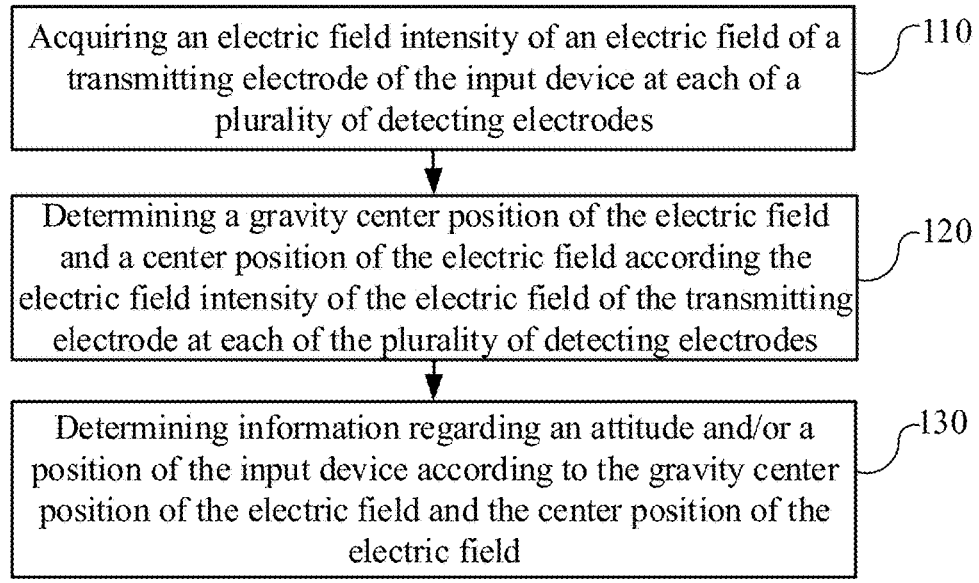
FIG. 1 is a schematic flow of a method for detecting an input device of an embodiment of the present disclosure.

FIG. 1 shows a schematic flow of a method 100 for detecting an input device according to an embodiment of the present disclosure. The method 100 may be executed by a detection device. As shown in FIG. 1, the method 100 may include:

S110, acquiring an electric field intensity of an electric field of a transmitting electrode of the input device at each of a plurality of detecting electrodes;

S120, determining a gravity center position of the electric field and a center position of the electric field according the electric field intensity of the electric field of the transmitting electrode at each of the plurality of detecting electrodes; and S130, determining information regarding an attitude and/or a position of the input device according to the gravity center position of the electric field and the center position of the electric field.

In the embodiment of the present disclosure, information regarding an attitude and/or a position of an input device, for example, information regarding a tilt angle, a horizontal angle or a touch position and the like of the input device, is determined according to a gravity center position of an electric field and a center position of the electric field, and in this way, these information may be acquired by only detecting one transmitting electrode, that is, a plurality of transmitting electrodes are not required, thus reducing power consumption and saving costs.

When an input device touches a touch plane, a transmitting electrode of the input device sends an electrical signal, and an electric field intensity at each of detecting electrodes may be detected by each of the detecting electrodes, that is, each of the detecting electrodes may detect the electrical signal sent by the transmitting electrode to acquire the electric field intensity at each of the detecting electrodes.

Optionally, in an embodiment of the present disclosure, the plurality of detecting electrodes include $N_1$ detecting electrodes in a first direction and $N_2$ detecting electrodes in a second direction, the first direction may be perpendicular to the second direction, $N_1 \geq 2$, and $N_2 \geq 2$.

Figure 2:
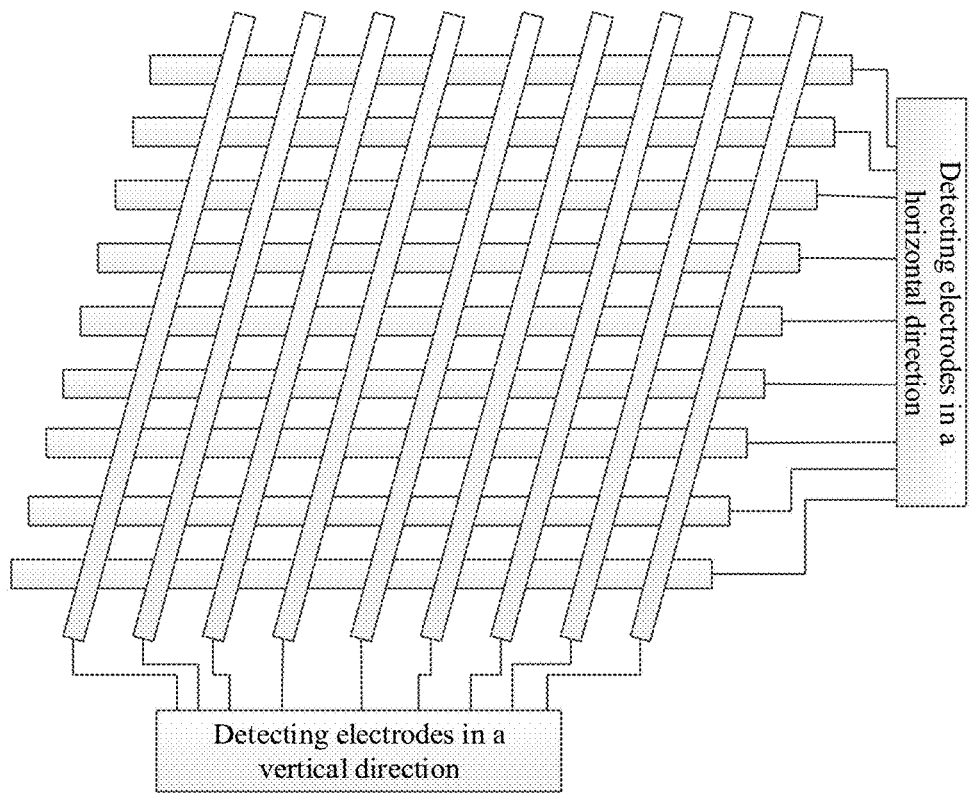
FIG. 2 is a schematic diagram of a detecting electrode of an embodiment of the present disclosure.

Specifically, the detecting electrodes in the detection device may adopt a two-dimensional array manner, for example, as shown in FIG. 2, the plurality of detecting electrodes may be classified into a plurality of detecting electrodes in a horizontal direction and a plurality of detecting electrodes in a vertical direction. Where the horizontal direction is the arrangement direction between the detecting electrodes in the horizontal direction. The vertical direction is the arrangement direction between the detecting electrodes in the vertical direction. The detecting electrodes in the horizontal direction may be the detecting electrodes in the first direction, and the detecting electrodes in the vertical direction may be the detecting electrodes in the second direction.

In an embodiment of the present disclosure, information regarding an attitude and/or a position of an input device is determined according to a gravity center position of an electric field and a center position of the electric field.

Optionally, in an embodiment of the present disclosure, the gravity center position $P_{gravity\ center} = (Px_{gravity\ center}, Py_{gravity\ center})$ of the electric field may be determined according to the following equations (1) and (2):

$$Px_{gravity\ center} = \frac{\sum_{x=1}^{N_1} E_x * x}{\sum_{x=1}^{N_1} E_x} \quad (1)$$

$$Py_{gravity\ center} = \frac{\sum_{y=1}^{N_2} E_y * y}{\sum_{y=1}^{N_2} E_y} \quad (2)$$

$P_{gravity\ center}$ represents the gravity center position of the electric field, $Px_{gravity\ center}$ represents a coordinate of the gravity center position of the electric field in the first direction, $Py_{barycenter}$ represents a coordinate of the gravity center position of the electric field in the second direction, x represents a coordinate of a detecting electrode in the first direction, $E_x$ represents an electric field intensity detected by the detecting electrode with the coordinate x in the first direction, $N_1$ represents a number of detecting electrodes in the first direction, $N_1 \geq 2$, y represents a coordinate of a detecting electrode in the second direction, $E_y$ represents an electric field intensity detected by the detecting electrode with the coordinate y in the second direction, $N_2$ represents a number of detecting electrodes in the second direction, and $N_2 \geq 2$, the first direction being perpendicular to the second direction.

Optionally, in an embodiment of the present disclosure, the center position $P_{center} = (Px_{center}, Py_{center})$ of the electric field may be determined according to the following equations (3) and (4):

$$\int_{x=1}^{x=Px_{center}} E_x = \frac{1}{2} \int_{x=1}^{x=N_1} E_x \quad (3)$$

$$\int_{y=1}^{y=Py_{center}} E_y = \frac{1}{2} \int_{y=1}^{y=N_2} E_y \quad (4)$$

$P_{center}$ represents the center position of the electric field, $Px_{center}$ represents a coordinate of the center position of the electric field in the first direction, and $Py_{center}$ represents a coordinate of the center position of the electric field in the second direction.

That is, $Px_{center}$ is a solution to the equation represented by the equation (3), and $Py_{center}$ is a solution to the equation represented by the equation (4).

Figure 3:
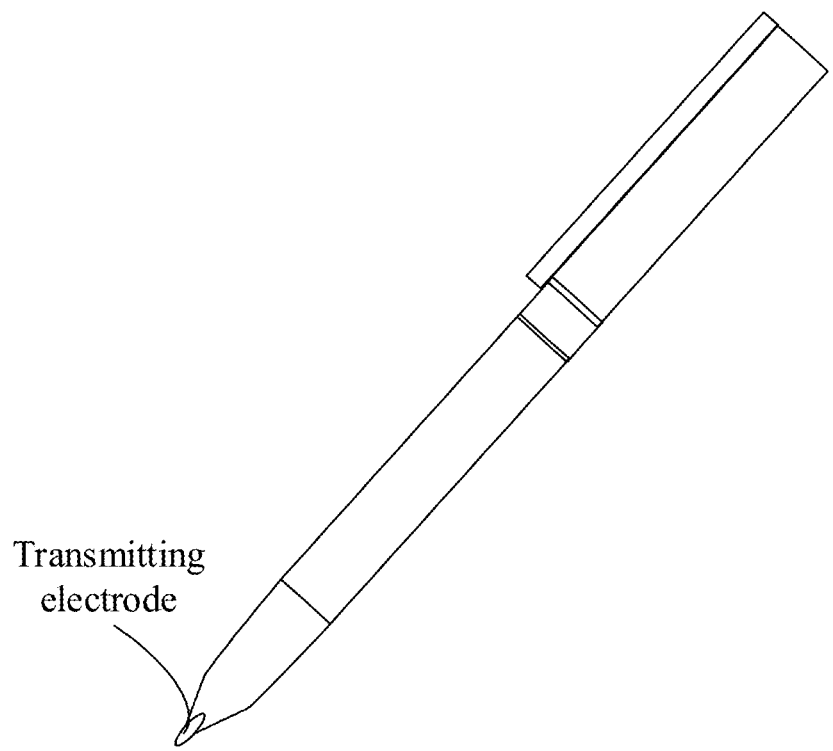
FIG. 3 is a schematic diagram of an input device of an embodiment of the present disclosure.
Figure 4:
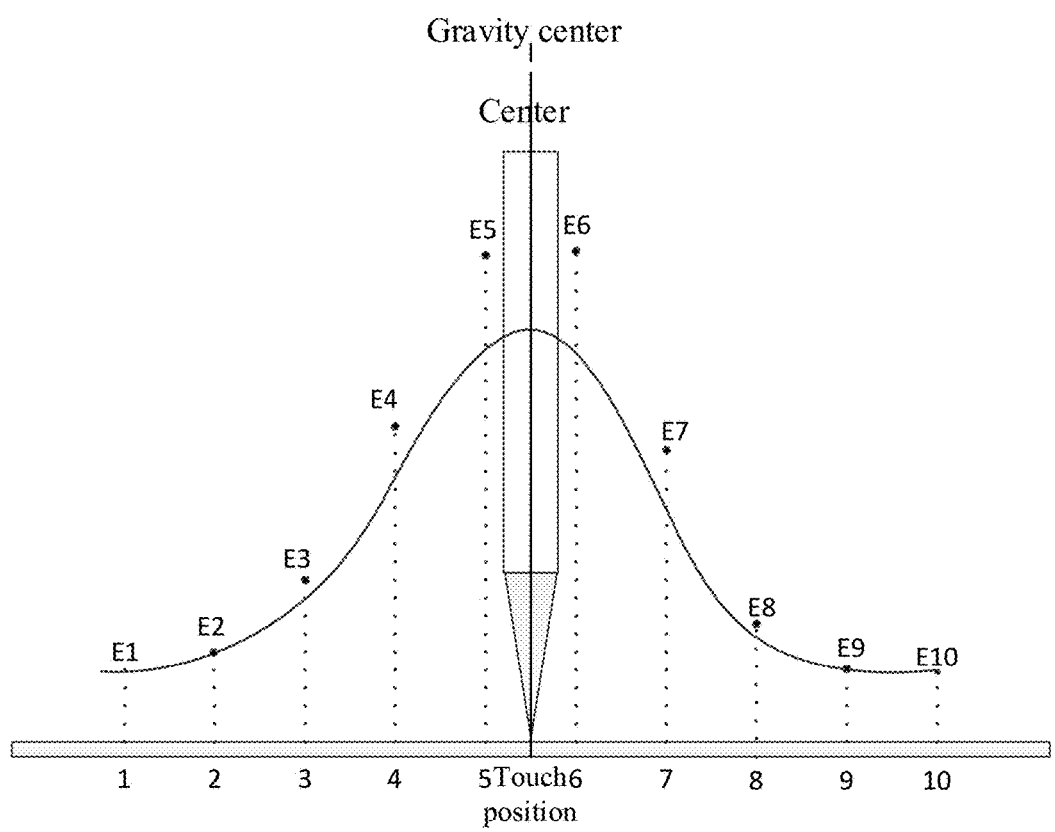
FIG. 4 is a schematic diagram of electric field distribution on a detecting electrode of an embodiment of the present disclosure.
Figure 5:
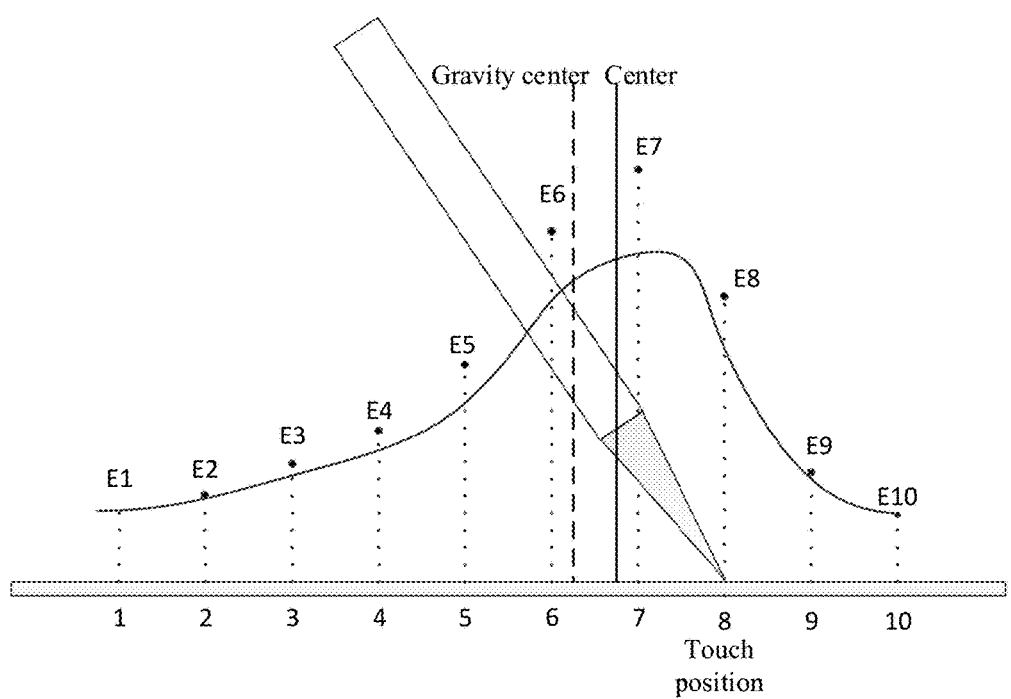
FIG. 5 is a schematic diagram of electric field distribution on a detecting electrode of another embodiment of the present disclosure.

It is assumed that a transmitting electrode is a point, then a gravity center position of an electric field and a center position of the electric field coincide. Generally, an input device is shaped like a pen, and a transmitting electrode in the input device has a certain length, i.e., being not a point. For example, as shown in FIG. 3, the input device is a capacitive pen, and the transmitting electrode is located in a pen point position and has a certain length. In this way, when the input device is perpendicular to a touch plane, three positions, i.e., the gravity center position of the electric field, the center position of the electric field, and an actual position where the input device touches the touch plane, coincide, and in this case, electric field distribution on a detecting electrode may be as shown in FIG. 4. It should be understood that FIG. 4 merely shows electric field distribution in one direction, and electric field distribution in the other direction is similar thereto. If the input device touches the touch plane at an arbitrary tilt angle, both the gravity center position of the electric field and the center position of the electric field are shifted as compared with an actual touch position, and a shift direction is equivalent to a tilt direction; in addition, the center position of the electric field is shifted further, and in this case, electric field distribution on the detecting electrode may be as shown in FIG. 5. Similarly, FIG. 5 merely shows electric field distribution in one direction, and electric field distribution in the other direction is similar thereto. Wherein, the coordinates 1, 2 . . . 10 in FIG. 4 and FIG. 5 may represent the coordinates of the detecting electrodes in the first direction, and E1, E2 . . . E10 may represent the electric field intensity detected by the detecting electrodes with the coordinates 1, 2 . . . 10 in the first direction. Or, the coordinates 1, 2 . . . 10 in FIG. 4 and FIG. 5 may represent the coordinates of the detecting electrodes in the second direction, and E1, E2 . . . E10 may represent the electric field intensity detected by the detecting electrodes with the coordinates 1, 2 . . . 10 in the second direction.

In an embodiment of the present disclosure, a shift between a gravity center position of an electric field and a center position of the electric field is utilized to determine various types of information of an input device when performing touching, for example, a tilt angle, a horizontal angle, a touch position, or the like.

Specifically, (dx, dy) is used to represent a vector between the gravity center position of the electric field and the center position of the electric field, that is, dx represents a shift in one direction (x direction), and dy represents a shift in the other direction (y direction). The vector may be represented as:

$$P_{diff} = P_{gravity\ center} - P_{center} = (dx, dy) \quad (5)$$

A modulus of the vector has a forward mapping relationship with a tilt degree of the input device, that is, the greater the tilt degree is, the greater the modulus of the vector will become. Therefore, the modulus of the vector may be utilized to determine a tilt angle α of the input device with respect to the touch plane. A direction of the vector may be used to determine a horizontal angle θ of the input device with respect to the touch plane.

Figure 6A:
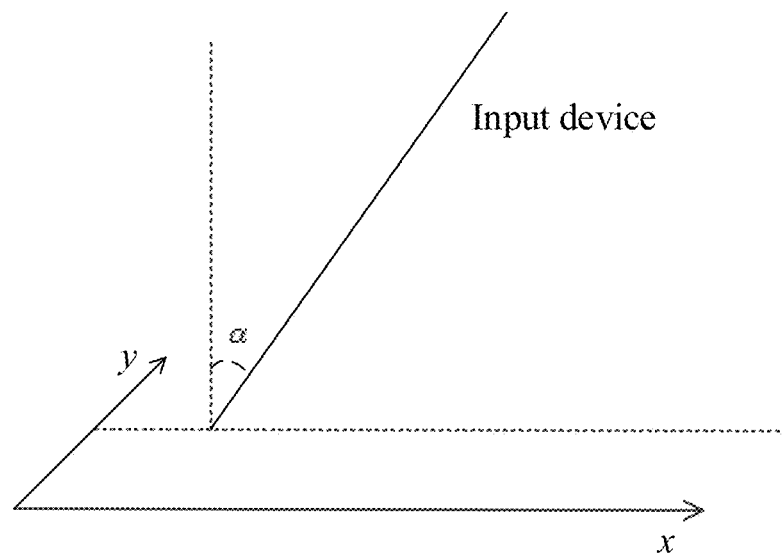
FIG. 6a is a schematic diagram of a tilt angle of an input device of an embodiment of the present disclosure.
Figure 6B:
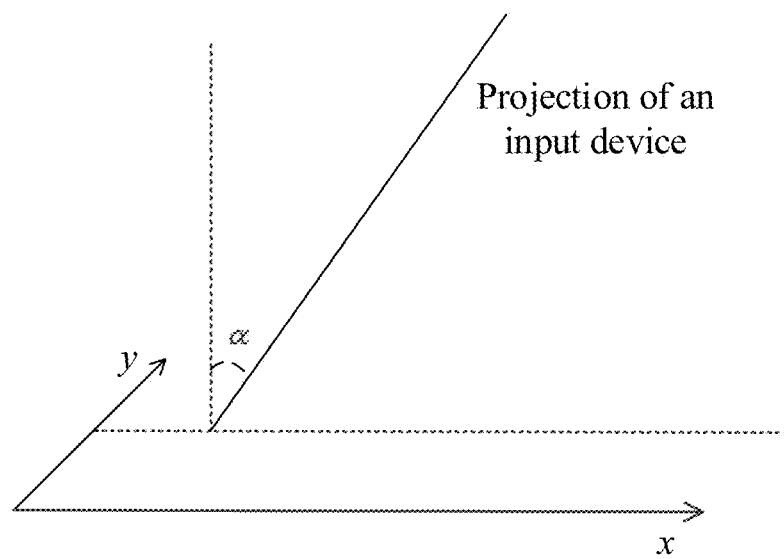
FIG. 6b is a schematic diagram of a horizontal angle of an input device of an embodiment of the present disclosure.

Optionally, as examples, FIGS. 6a and 6b respectively show schematic diagrams of a tilt angle α and a horizontal angle θ. In FIG. 6a, a represents an angle of an input device deviating from a normal line of a touch plane. In FIG. 6b, B represents an angle of the projection of an input device on a touch plane that deviates from an x-axis direction. It should be understood that FIGS. 6a and 6b are merely examples, and the present disclosure does not limit a representation manner of a tilt angle and a horizontal angle.

Optionally, in an embodiment of the present disclosure, the tilt angle α of the input device may be determined according to the following equation (6):

$$\alpha = f(|dx, dy|) \quad (6)$$

where (dx, dy) represents a vector between the gravity center position of the electric field and the center position of the electric field, | | represents a modulus of the vector, and f represents a forward mapping relationship.

It should be understood that, in a specific application of the above forward mapping relationship, a training mode may be adopted to determine a specific mapping relationship, i.e., an absolute value for each touch is obtained, or a relative value mode may be adopted to acquire a relative value between different touches.

Optionally, in an embodiment of the present disclosure, the horizontal angle θ of the input device may be determined according to the following equation (7):

$$\theta = \arctan\left(\frac{dy}{dx}\right) \quad (7)$$

where (dx, dy) represents a vector between the gravity center position of the electric field and the center position of the electric field.

In addition to obtaining a tilt angle and a horizontal angle of an input device, an actual touch position of the input device on a touch plane may also be determined according to a gravity center position of an electric field and a center position of the electric field. Optionally, in an embodiment of the present disclosure, a touch position $P_{actual}$ of the input device may be determined according to the following equation (8):

$$P_{actual} = P_{center} + h(P_{center} - P_{gravity\ center}) \quad (8)$$

where $P_{gravity\ center}$ is the gravity center position of the electric field, $P_{center}$ is the center position of the electric field, and h represents a forward mapping relationship.

Similarly, in a specific application of the above forward mapping relationship, a training mode may be adopted to determine a specific mapping relationship, i.e., an absolute value for each touch is obtained, or a relative value mode may be adopted to acquire a relative value between different touches Therefore, by adopting the technical solutions of the embodiments of the present disclosure, a touch position of an input device may be calibrated.

Therefore, by determining various types of information of an input device when performing touching according to a gravity center position of an electric field and a center position of the electric field, a method for detecting an input device of an embodiment of the present disclosure may acquire these information by only detecting one transmitting electrode, that is, a plurality of transmitting electrodes is not required, thus reducing power consumption and saving costs. In addition, an input device required for the technical solutions of the embodiments of the present disclosure may have only one transmitting electrode, and a corresponding structure design is simpler.

It should be understood that, in various embodiments of the present disclosure, values of sequence numbers of the above-mentioned various processes do not mean an order of execution which should be determined based upon functionalities and internal logics thereof, rather than setting any limitation to implementation processes of the embodiments of the present disclosure.

The method for detecting an input device according to the embodiments of the present disclosure has been described above in detail, and a detection device and a system according to embodiments of the present disclosure will be described below.

It should be understood that a device in the embodiments of the present disclosure may execute the method in the embodiments of the present disclosure, and has a function for executing a corresponding method.

Figure 7:
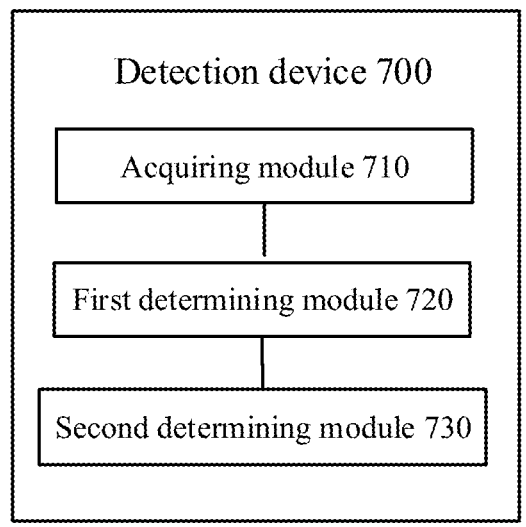
FIG. 7 is a schematic block diagram of a detection device of an embodiment of the present disclosure.

FIG. 7 shows a schematic block diagram of a detection device 700 of an embodiment of the present disclosure. As shown in FIG. 7, the detection device 700 may include:

an acquiring module 710, configured to acquire an electric field intensity of an electric field of a transmitting electrode of the input device at each of a plurality of detecting electrodes;

a first determining module 720, configured to determine a gravity center position of an electric field and a center position of the electric field according the electric field intensity of the electric field of the transmitting electrode at each of the plurality of detecting electrodes; and a second determining module 730, configured to determine information regarding an attitude and/or a position of the input device according to the gravity center position of the electric field and the center position of the electric field.

By determining information regarding an attitude and/or a position of an input device according to a gravity center position of an electric field and a center position of the electric field, a detection device of the embodiment of the present disclosure may acquire these information by only detecting one transmitting electrode, that is, a plurality of transmitting electrodes is not required, thus reducing power consumption and saving costs.

Optionally, in an embodiment of the present disclosure, the acquiring module 710 includes the plurality of detecting electrodes, and the plurality of detecting electrodes include $N_1$ detecting electrodes in a first direction and $N_2$ detecting electrodes in a second direction, the first direction being perpendicular to the second direction, $N_1 \geq 2$, and $N_2 \geq 2$.

Optionally, in an embodiment of the present disclosure, the first determining module 720 is specifically configured to:

determine the gravity center position $P_{gravity\ center}=(Px_{gravity\ center}, Py_{gravity\ center})$ of the electric field according to the following equations:

$$Px_{gravity\ center} = \frac{\sum_{x=1}^{N_1} E_x * x}{\sum_{x=1}^{N_1} E_x},$$

$$Py_{gravity\ center} = \frac{\sum_{y=1}^{N_2} E_y * y}{\sum_{y=1}^{N_2} E_y},$$

and determine the center position $P_{center}=(Px_{center}, Py_{center})$ of the electric field according to the following equations:

$$\int_{x=1}^{x=Px_{center}} E_x = \frac{1}{2}\int_{x=1}^{x=N_1} E_x,$$

$$\int_{y=1}^{y=Py_{center}} E_y = \frac{1}{2}\int_{y=1}^{y=N_2} E_y,$$

where $P_{gravity\ center}$ represents the gravity center position of the electric field, $Px_{gravity\ center}$ represents a coordinate of the gravity center position of the electric field in a first direction, $Py_{gravity\ center}$ represents a coordinate of the gravity center position of the electric field in a second direction, $P_{center}$ represents the center position of the electric field, $Px_{center}$ represents a coordinate of the center position of the electric field in the first direction, $Py_{center}$ represents a coordinate of the center position of the electric field in the second direction, x represents a coordinate of a detecting electrode in the first direction, $E_x$ represents an electric field intensity detected by the detecting electrode with the coordinate x in the first direction, $N_1$ represents a number of detecting electrodes in the first direction, $N_1 \geq 2$, y represents a coordinate of a detecting electrode in the second direction, $E_y$ represents an electric field intensity detected by the detecting electrode with the coordinate y in the second direction, $N_2$ represents a number of detecting electrodes in the second direction, and $N_2 \geq 2$, the first direction being perpendicular to the second direction.

Optionally, in an embodiment of the present disclosure, the second determining module 730 is specifically configured to:

determine a tilt angle α of the input device according to the following equation:

$$\alpha = f(|dx, dy|),$$

where (dx, dy) represents a vector between the gravity center position of the electric field and the center position of the electric field, | | represents a modulus of the vector, and f represents a forward mapping relationship.

Optionally, in an embodiment of the present disclosure, the second determining module 730 is specifically configured to:

determine a horizontal angle θ of the input device according to the following equation:

$$\theta = \arctan\left(\frac{dy}{dx}\right),$$

where (dx, dy) represents a vector between the gravity center position of the electric field and the center position of the electric field.

Optionally, in an embodiment of the present disclosure, the second determining module 730 is specifically configured to:

determine a touch position $P_{actual}$ of the input device according to the following equation:

$$P_{actual} = P_{center} + h(P_{center} - P_{gravity\ center}),$$

where $P_{gravity\ center}$ is the gravity center position of the electric field, $P_{center}$ is the center position of the electric field, and h represents a forward mapping relationship.

The detection device 700 according to the embodiments of the present disclosure may correspond to an executive entity of the method for detecting an input device according to the embodiments of the present disclosure; moreover, the above or other operations and/or functions of various modules in the detection device 700 are respectively for corresponding procedures of each of the preceding methods, and for concision, they will not be described redundantly herein.

Figure 8:
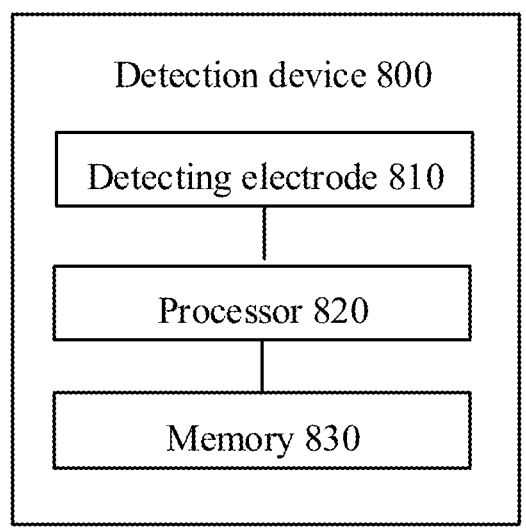
FIG. 8 is a schematic block diagram of a detection device of another embodiment of the present disclosure.

FIG. 8 shows a schematic block diagram of a detection device 800 of another embodiment of the present disclosure. As shown in FIG. 8, the detection device 800 includes a plurality of detecting electrodes 810, a processor 820 and a memory 830.

The plurality of detecting electrodes 810 are configured to detect an electric field intensity of an electric field of a transmitting electrode of an input device at each of the plurality of detecting electrodes 810.

The memory 830 is configured to store a program. Specifically, the program may include a program code, and the program code includes a computer operating instruction. The memory 830 may include a read only memory and a random access memory, and provides an instruction and data to the processor 820. The memory 830 may either contain a high-speed random access memory (Random-Access Memory, RAM), or include a non-volatile memory (non-volatile memory), for example, at least one magnetic disk memory.

Optionally, the memory 830 may store a program for implementing the above method for detecting an input device of the embodiments of the present disclosure.

Optionally, the processor 820 executes the program stored in the memory 830 for executing the above method for detecting an input device of the embodiments of the present disclosure.

The processor 820 may be an integrated circuit chip with a signal processing capability. In an implementation process, respective steps of the above method may be completed by an integrated logic circuit of hardware in the processor 820 or an instruction in a form of software. The above processor 820 may be a general processor including a central processing unit (Central Processing Unit, CPU), a network processor (Network Processor, NP) and the like, and may also be a digital signal processor (Digital Signal Processor, DSP), an application specific integrated circuit (Application Specific Integrated Circuit, ASIC), a field-programmable gate array (Field-Programmable Gate Array, FPGA) or other programmable logic devices, discrete gate or transistor logic devices, discrete hardware components, which may implement or execute respective methods, steps and logic diagrams disclosed in the embodiments of the present disclosure. The general processor may be either a microprocessor or any conventional processor, etc. A step of a method disclosed with reference to the embodiments of the present disclosure may be directly embodied as being executed and completed either by a hardware processor, or a combination of a hardware module and a software module in a processor. The software module may reside in a mature storage medium in the art, for example, a random access memory, a flash memory, a read-only memory, a programmable read-only memory or an electrically erasable programmable memory, a register and the like. The storage medium is located in the memory 830, and the processor 820 reads information in the memory 830 and completes the step of the above-mentioned method in combination with the hardware thereof.

An embodiment of the present disclosure further provides a system, where the system may include:

an input device including a transmitting electrode; and the above detection device in the embodiments of the present disclosure.

The input device may include only one transmitting electrode. The detection device may acquire various types of information of the input device when performing touching by only detecting one transmitting electrode, thus reducing power consumption and saving costs.

It should be understood that, as for various formulas in the embodiments of the present disclosure, other equivalent transformations may be performed, for example, adding or multiplying a constant, etc., and all of these transformations shall be encompassed within the protection scope of the present disclosure.

It should be understood that specific examples in the embodiments of the present disclosure herein are just for helping a person skilled in the art to better understand the embodiments of the present disclosure, rather than for limiting the scope of the embodiments of the present disclosure.

It should be understood that, in the embodiments of the present disclosure, the term "and/or" merely describes an association relationship between associated objects and expresses that three relationships may exist. For example, A and/or B may represent the following three cases: A exists separately, A and B exist simultaneously, and B exists separately. In addition, the character "/" herein generally represents an "or" relationship between two related objects before and after the character.

A person of ordinary skill in the art may realize that, units and algorithm steps of various examples described in connection with the embodiments disclosed herein can be implemented by electronic hardware, computer software, or a combination of the two, and in order to clearly describe the interchangeability of hardware and software, in the above description, the composition and steps of the various examples have been generally described according to functions. Whether these functions are executed in a manner of hardware or in a manner of software depends on the specific applications and design constraints of the technical solution. A person skilled may implement the described functions by using different methods for each specific application, but this implementation should not be considered to be beyond the scope of the present disclosure.

A person skilled in the art may clearly understand that, for convenience and simplicity of description, the specific working processes of the system, the apparatus and the units described above may refer to corresponding processes in the foregoing method embodiments, which will not be described redundantly herein.

In several embodiments provided in the present application, it should be understood that, the disclosed system, apparatus and method may be implemented in other manners. For example, the apparatus embodiments described above are merely exemplary, for example, the division of the units is merely a logic function division, and other division manners may exist in practical implementation, for example, a plurality of units or components may be combined or integrated to another system, or some features may be omitted or be not executed. In addition, the displayed or discussed mutual coupling or direct coupling or communication connection may be indirect coupling or a communication connection of apparatuses or units through some interfaces, and may also be a connection in electrical, mechanical or other forms.

The units described as separate parts may be or may not be separated physically, and a component displayed as a unit may be or may not be a physical unit, namely, may be located in one place, or may be distributed on a plurality of network units. Some or all of the units may be selected to achieve the purposes of the solutions in the embodiments of the present disclosure according to actual needs.

In addition, in various embodiments of the present disclosure, respective functional units may be integrated in one processing unit, or the respective functional units may physically exist separately, or two or more units may be integrated in one unit. The above integrated unit may be implemented either in a form of hardware or a form of a software functional unit.

If the integrated unit is implemented in the form of the software functional unit and is sold or used as an independent product, it may be stored in a computer readable storage medium. Based on such an understanding, the technical solution of the present disclosure substantially, or the part of the present disclosure making contribution to the related art, or all of or a part of the technical solution may be embodied in a form of a software product, and the computer software product is stored in a storage medium, which includes multiple instructions for enabling a computer device (which may be a personal computer, a server, a network device or the like) to execute all of or some of the steps of the methods described in the respective embodiments of the present disclosure. In addition, the foregoing storage medium includes a variety of media capable of storing program codes, for example, a USB disk, a mobile hard disk, a read-only memory (ROM, Read-Only Memory), a random access memory (RAM, Random Access Memory), a magnetic disk, an optical disk and the like.

Described above is merely the specific embodiments of the present disclosure, whereas the protection scope of the present disclosure is not limited to this. Any person who is skilled and familiar with the present technical field may readily conceive of various equivalent modifications or substitutions within the technical scope disclosed by the present disclosure, and all of these modifications or substitutions shall fall within the protection scope of the present disclosure. Therefore, the protection scope of the present disclosure shall be defined by the claims.

What is claimed is:

1. A method for detecting an input device, comprising:
acquiring an electric field intensity of an electric field of a transmitting electrode of the input device at each of a plurality of detecting electrodes;
determining a gravity center position of the electric field and a center position of the electric field according to the electric field intensity of the electric field of the transmitting electrode at each of the plurality of detecting electrodes; and
determining information regarding at least one of an attitude or a position of the input device according to the gravity center position of the electric field and the center position of the electric field;
wherein the gravity center position $P_{gravity\ center} = (Px_{gravity\ center}, Py_{gravity\ center})$ of the electric field is determined according to equations represented by:

$$Px_{gravity\ center} = \frac{\sum_{x=1}^{N_1} E_x * x}{\sum_{x=1}^{N_1} E_x}, \text{ and}$$

$$Py_{gravity\ center} = \frac{\sum_{y=1}^{N_2} E_y * y}{\sum_{y=1}^{N_2} E_y}; \text{ and}$$

the center position $P_{center} = (Px_{center}, Py_{center})$ of the electric field is determined according to equations represented by:

$$\int_{x=1}^{x=Px_{center}} E_x = \frac{1}{2} \int_{x=1}^{x=N_1} E_x, \text{ and}$$

$$\int_{y=1}^{y=Py_{center}} E_y = \frac{1}{2} \int_{y=1}^{y=N_2} E_y;$$

wherein $P_{gravity\ center}$ represents the gravity center position of the electric field, $Px_{gravity\ center}$ represents a coordinate of the gravity center position of the electric field in a first direction, $Py_{gravity\ center}$ represents a coordinate of the gravity center position of the electric field in a second direction, P center represents the center position of the electric field, $Px_{center}$ represents a coordinate of the center position of the electric field in the first direction, $Py_{center}$ represents a coordinate of the center position of the electric field in the second direction, x represents a coordinate of a detecting electrode in the first direction, $E_x$ represents an electric field intensity detected by the detecting electrode with the coordinate x in the first direction, $N_1$ represents a number of detecting electrodes in the first direction, $N_1 \geq 2$, y represents a coordinate of a detecting electrode in the second direction, $E_y$ represents an electric field intensity detected by the detecting electrode with the coordinate y in the second direction, $N_2$ represents a number of detecting electrodes in the second direction, and $N_2 \geq 2$, the first direction being perpendicular to the second direction.

2. The method according to claim 1, wherein the plurality of detecting electrodes comprise $N_1$ detecting electrodes in the first direction and $N_2$ detecting electrodes in the second direction.

3. The method according to claim 1, wherein the determining the information regarding the attitude and/or the position of the input device according to the gravity center position of the electric field and the center position of the electric field comprises:
determining a tilt angle α of the input device according to an equation represented by:

$$\alpha = f(|dx, dy|)$$

wherein (dx, dy) represents a vector between the gravity center position of the electric field and the center position of the electric field, | | represents a modulus of the vector, and f represents a specific mapping relationship determined in a training mode.

4. The method according to claim 1, wherein the determining the information regarding the attitude and/or the position of the input device according to the gravity center position of the electric field and the center position of the electric field comprises:
determining a horizontal angle θ of the input device according to an equation represented by:

$$\theta = \arctan\left(\frac{dy}{dx}\right),$$

wherein (dx, dy) represents a vector between the gravity center position of the electric field and the center position of the electric field.

5. The method according to claim 1, wherein the determining the information regarding the attitude and/or the position of the input device according to the gravity center position of the electric field and the center position of the electric field comprises:
determining a touch position $P_{actual}$ of the input device according to an equation represented by:

$$P_{actual} = P_{center} + h(P_{center} - P_{gravity\ center}),$$

wherein $P_{gravity\ center}$ is the gravity center position of the electric field, $P_{center}$ is the center position of the electric field, and h represents a specific forward mapping relationship determined in a training mode.

6. A detection device, comprising:
a processor, configured to acquire an electric field intensity of an electric field of a transmitting electrode of an input device at each of a plurality of detecting electrodes;
the processor is further configured to determine a gravity center position of an electric field and a center position of the electric field according to the electric field intensity of the electric field of the transmitting electrode at each of the plurality of detecting electrodes; and
the processor is further configured to determine information regarding at least one of an attitude or a position of the input device according to the gravity center position of the electric field and the center position of the electric field;
wherein the processor is configured to:
determine the gravity center position $P_{gravity\ center} = (Px_{gravity\ center}, Py_{gravity\ center})$ of the electric field according to equations represented by:

$$Px_{gravity\ center} = \frac{\sum_{x=1}^{N_1} E_x * x}{\sum_{x=1}^{N_1} E_x}, \text{ and}$$

$$Py_{gravity\ center} = \frac{\sum_{y=1}^{N_2} E_y * y}{\sum_{y=1}^{N_2} E_y}; \text{ and}$$

the center position $P_{center} = (Px_{center}, Py_{center})$ of the electric field is determined according to equations represented by:

$$\int_{x=1}^{x=Px_{center}} E_x = \frac{1}{2} \int_{x=1}^{x=N_1} E_x, \text{ and}$$

$$\int_{y=1}^{y=Py_{center}} E_y = \frac{1}{2} \int_{y=1}^{y=N_2} E_y;$$

wherein $P_{gravity\ center}$ represents the gravity center position of the electric field, $Px_{gravity\ center}$ represents a coordinate of the gravity center position of the electric field in a first direction, $Py_{gravity\ center}$ represents a coordinate of the gravity center position of the electric field in a second direction, $P_{center}$ represents the center position of the electric field, $Px_{center}$ represents a coordinate of the center position of the electric field in the first direction, $Py_{center}$ represents a coordinate of the center position of the electric field in the second direction, x represents a coordinate of a detecting electrode in the first direction, $E_x$ represents an electric field intensity detected by the detecting electrode with the coordinate x in the first direction, $N_1$ represents a number of detecting electrodes in the first direction, $N_1 \geq 2$, y represents a coordinate of a detecting electrode in the second direction, $E_y$ represents an electric field intensity detected by the detecting electrode with the coordinate y in the second direction, $N_2$ represents a number of detecting electrodes in the second direction, and $N_2 \geq 2$, the first direction being perpendicular to the second direction.

7. The detection device according to claim 6, wherein the acquiring module comprises the plurality of detecting electrodes, and the plurality of detecting electrodes comprise $N_1$ detecting electrodes in the first direction and $N_2$ detecting electrodes in the second direction.

8. The detection device according to claim 6, wherein the processor second determining module is configured to:
determine a tilt angle α of the input device according to an equation represented by:

α=f(|dx,dy|), wherein (dx, dy) represents a vector between the gravity center position of the electric field and the center position of the electric field, | | represents a modulus of the vector, and f represents a specific mapping relationship determined in a training mode.

9. The detection device according to claim 6, wherein the processor second determining module is configured to:

determine a horizontal angle θ of the input device according to an equation represented by:

$$\theta = \arctan\left(\frac{dy}{dx}\right),$$

wherein (dx, dy) represents a vector between the gravity center position of the electric field and the center position of the electric field.

10. The detection device according to claim 6, wherein the processor is configured to:
determine a touch position $P_{actual}$ of the input device according to an equation represented by:

$P_{actual} = P_{center} + h(P_{center} - P_{gravity\ center})$, wherein $P_{gravity\ center}$ is the gravity center position of the electric field, $P_{center}$ is the center position of the electric field, and h represents a specific mapping relationship determined in a training mode.

11. A system, comprising:
an input device comprising a transmitting electrode; and
a detection device, comprising:
a processor, configured to acquire an electric field intensity of an electric field of a transmitting electrode of the input device at each of a plurality of detecting electrodes;
the processor is further configured to determine a gravity center position of an electric field and a center position of the electric field according to the electric field intensity of the electric field of the transmitting electrode at each of the plurality of detecting electrodes; and
the processor is further configured to determine information regarding at least one of an attitude or a position of the input device according to the gravity center position of the electric field and the center position of the electric wherein the processor is configured to:
determine the gravity center position $P_{gravity\ center} = (Px_{gravity\ center}, Py_{gravity\ center})$ of the electric field according to equations represented by:

$$Px_{gravity\ center} = \frac{\sum_{x=1}^{N_1} E_x * x}{\sum_{x=1}^{N_1} E_x}, \text{ and}$$

$$Py_{gravity\ center} = \frac{\sum_{y=1}^{N_2} E_y * y}{\sum_{y=1}^{N_2} E_y}; \text{ and}$$

the center position $P_{center} = (Px_{center}, Py_{center})$ of the electric field is determined according to equations represented by:

$$\int_{x=1}^{x=Px_{center}} E_x = \frac{1}{2} \int_{x=1}^{x=N_1} E_x, \text{ and}$$

$$\int_{y=1}^{y=Py_{center}} E_y = \frac{1}{2} \int_{y=1}^{y=N_2} E_y;$$

wherein $P_{gravity\ center}$ represents the gravity center position of the electric field, $Px_{gravity\ center}$ represents a coordinate of the gravity center position of the electric field in a first direction, $Py_{gravity\ center}$ represents a coordinate of the gravity center position of the electric field in a second direction, $P_{center}$ represents the center position of the electric field, $Px_{center}$ represents a coordinate of the center position of the electric field in the first direction, $Py_{center}$ represents a coordinate of the center position of the electric field in the second direction, x represents a coordinate of a detecting electrode in the first direction, $E_X$ represents an electric field intensity detected by the detecting electrode with the coordinate x in the first direction, $N_1$ represents a number of detecting electrodes in the first direction, $N_1 \geq 2$, y represents a coordinate of a detecting electrode in the second direction, $E_y$ represents an electric field intensity detected by the detecting electrode with the coordinate y in the second direction, $N_2$ represents a number of detecting electrodes in the second direction, and $N_2 \geq 2$, the first direction being perpendicular to the second direction.

12. The system according to claim 11, wherein the acquiring module comprises the plurality of detecting electrodes, and the plurality of detecting electrodes comprise $N_1$ detecting electrodes in the first direction and $N_2$ detecting electrodes in the second direction.

13. The system according to claim 11, wherein the processor is configured to:

determine a tilt angle α of the input device according to an equation represented by:

$$\alpha = f(|dx, dy|),$$

wherein (dx, dy) represents a vector between the gravity center position of the electric field and the center position of the electric field, | | represents a modulus of the vector, and f represents a specific mapping relationship determined in a training mode.

14. The system according to claim 11, wherein the processor is configured to:

determine a horizontal angle θ of the input device according to an equation represented by:

$$\theta = \arctan\left(\frac{dy}{dx}\right),$$

wherein (dx, dy) represents a vector between the gravity center position of the electric field and the center position of the electric field.

15. The system according to claim 11, wherein the processor second determining module is configured to:

determine a touch position $P_{actual}$ of the input device according to an equation represented by:

$$P_{actual} = P_{center} + h(P_{center} - P_{gravity\ center}),$$

wherein $P_{gravity\ center}$ is the gravity center position of the electric field, $P_{center}$ is the center position of the electric field, and h represents a specific mapping relationship determined in a training mode.

* * * * *